(12) United States Patent
Akinaga et al.

(10) Patent No.: US 7,899,824 B2
(45) Date of Patent: Mar. 1, 2011

(54) DISTRIBUTING ADVERTISEMENTS TO DISTRIBUTION TARGET NODES BASED ON A CLUSTERING COEFFICIENT

(75) Inventors: Yoshikazu Akinaga, Fujisawa (JP); Jun Sasaki, Yokosuka (JP); Takeshi Ihara, Yokosuka (JP); Akira Miura, Kunitachi (JP)

(73) Assignee: NTT DoCoMo, Inc., Tokyo (JP)

( * ) Notice: Subject to any disclaimer, the term of this patent is extended or adjusted under 35 U.S.C. 154(b) by 1140 days.

(21) Appl. No.: 11/560,595

(22) Filed: Nov. 16, 2006

(65) Prior Publication Data

US 2007/0136309 A1 Jun. 14, 2007

(30) Foreign Application Priority Data

Nov. 17, 2005 (JP) .......................... P2005-332847

(51) Int. Cl.
*G06F 17/30* (2006.01)
*G06Q 30/00* (2006.01)
(52) U.S. Cl. ...................... 707/737; 707/944; 705/14.49
(58) Field of Classification Search ....................... None
See application file for complete search history.

(56) References Cited

U.S. PATENT DOCUMENTS

| 6,643,650 | B1 * | 11/2003 | Slaughter et al. ................. 1/1 |
| 7,246,083 | B2 * | 7/2007 | Bibelnieks et al. ........ 705/14.43 |
| 7,251,616 | B1 * | 7/2007 | Perttunen ................. 705/14.53 |
| 7,308,497 | B2 * | 12/2007 | Louviere et al. ............ 709/224 |
| 7,716,209 | B1 * | 5/2010 | Rappaport et al. .......... 707/713 |
| 2002/0129114 | A1 * | 9/2002 | Sundaresan et al. ......... 709/213 |
| 2005/0234895 | A1 * | 10/2005 | Kramer ........................ 707/3 |
| 2007/0121843 | A1 * | 5/2007 | Atazky et al. .......... 379/114.13 |
| 2007/0192164 | A1 * | 8/2007 | Nong et al. .................... 705/10 |

FOREIGN PATENT DOCUMENTS

| JP | 2004-165901 | | 6/2004 |
| JP | 2005-284555 | | 10/2005 |
| KR | 2002092843 | A * | 12/2002 |

OTHER PUBLICATIONS

Moshe Sniedovich, "Dijkstra's algorithm revisited: the dynamic programming connexion", Nov. 2006, The University of Melbourne: Control and Cybernetics, vol. 35 No. 3, pp. 599-620.*
Chickering et al., "Targeted advertising with inventory management", 2000, ACM, EC '00: Proceedings of the 2nd ACM conference on Electronic commerce, 145-149.*

* cited by examiner

*Primary Examiner*—Pierre M Vital
*Assistant Examiner*—Christopher P Nofal
(74) *Attorney, Agent, or Firm*—Oblon, Spivak, McClelland, Maier & Neustadt, L.L.P.

(57) ABSTRACT

A cluster extractor extracts a plurality of clusters based on communication records between communication terminals. A clustering coefficient calculator, an average path length calculator, and a degree distribution calculator calculate a clustering coefficient, an average path length in an advertisement distribution target cluster, and a degree distribution, respectively, based on communication records between communication terminals belonging to an advertisement distribution target cluster. An advertising strategy determiner determines an advertising strategy, based on the clustering coefficient and the average path length, and a distribution target determiner determines a distribution target terminal, based on the degree distribution and the advertising strategy. A determined target notifier notifies a communication management device of the distribution target terminal and the advertising strategy and an advertisement distributor distributes an advertisement according to the advertising strategy to the distribution target communication terminal.

4 Claims, 5 Drawing Sheets

DISTRIBUTING ADVERTISEMENTS TO DISTRIBUTION TARGET NODES BASED ON A CLUSTERING COEFFICIENT

BACKGROUND OF THE INVENTION

1. Field of the Invention

The present invention relates to an advertisement distributing system and advertisement distributing method.

2. Related Background

Telecommunications carriers provide various communication services including community services, in addition to general communication services such as mail and circuit switching, in order to enhance added values to the communication services. As providing the various communication services, the telecommunications carriers distribute a variety of advertisements to users in order to promote subscription with each communication service, use of each communication service, and so on (e.g., Japanese Patent Application Laid-Open No. 2005-284555).

SUMMARY OF THE INVENTION

Incidentally, objects for provision of services differ depending upon the communication services. Therefore, advertising strategies need to be determined for each of the communication services, in order to efficiently distribute advertisements about the communication services for promotion of subscription, promotion of use, and so on. It is, however, difficult to appropriately distribute advertisements to users truly using or requesting the services.

An object of the present invention is therefore to provide an advertisement distributing system and advertisement distributing method capable of appropriately distributing advertisements about communication services, in order to solve the above-described problem.

An advertisement distributing system of the present invention is an advertisement distributing system that extracts a plurality of clusters, based on communication records between nodes at a plurality of nodes and calculates, based on communication records between nodes belonging to one extracted cluster a clustering coefficient indicating a use state of communication in the one cluster. The advertising distributing system also calculates an average path length between the nodes belonging to the one cluster, based on the communication records between the nodes belonging to the one cluster and a degree distribution indicating node counts for respective correspondent counts of the nodes belonging to one cluster, based on the communication records between the nodes belonging to the one cluster. Further, the advertising distributing system selects and determines at least one advertising strategy from a plurality of advertising strategies, based on the clustering coefficient and the average path length, and a distribution target node as a target for distribution of an advertisement from the nodes belonging to the one cluster, based on the degree distribution and the advertising strategy. The advertisement corresponding to the advertising strategy is then distributed to the distribution target node.

An advertisement distributing method of the present invention is an advertisement distributing method including the following steps executed by a computer: extracting a plurality of clusters, based on communication records between nodes at a plurality of nodes, calculating a clustering coefficient, based on communication records between nodes belonging to one cluster, indicating a use state of communication in the one cluster, calculating an average path length between the nodes belonging to the one cluster, based on the communication records between the nodes belonging to the one cluster, a calculating a degree distribution indicating node counts for respective correspondent counts of the nodes belonging to the one cluster, based on the communication records between the nodes belonging to the one cluster, selecting and determining at least one advertising strategy from a plurality of advertising strategies, based on the clustering coefficient and the average path length, selecting and determining a distribution target node as a target for distribution of an advertisement from the nodes belonging to the one cluster, based on the degree distribution and the advertising strategy, and distributing the advertisement corresponding to the advertising strategy to the distribution target node.

According to these aspects of the invention, a plurality of clusters are formed in consideration of the communication records between nodes and a clustering coefficient indicating a use state of communication in one cluster is calculated. Therefore it becomes feasible to grasp the use state of communication in one cluster. Further an average path length between the nodes belonging to the one cluster is calculated and it thus becomes feasible to grasp a structure of communication relationship between the nodes belonging to the one cluster. A degree distribution indicating node counts for respective correspondent counts of the respective nodes belonging to the one cluster is calculated and it thus becomes feasible to grasp a distribution of correspondent counts of the respective nodes belonging to the one cluster. In addition, an advertising strategy in consideration of the clustering coefficient and the average path length is determined and it thus becomes feasible to determine the advertising strategy according to the use state of communication and the communication relationship between the nodes. Also a distribution target node in consideration of the degree distribution and the advertising strategy is determined and it thus becomes feasible to determine the distribution target node matching the foregoing advertising strategy, in consideration of the correspondent counts of the respective nodes. Further, an advertisement corresponding to the advertising strategy to the distribution target node is distributed. This enables the advertisement corresponding to the advertising strategy determined according to the use state of communication and the communication relationship between the nodes to be distributed to the distribution target node determined in consideration of the correspondent counts of the respective nodes, and it is thus feasible to appropriately distribute the advertisement about the communication service.

In the advertisement distributing system of the present invention, an advertising strategy including a factor to enable the clustering coefficient and the average path length to become closer to respective predetermined values is selected. This permits the clustering coefficient and the average path length to become closer to the respective predetermined values. This permits the clustering coefficient and the average path length to become closer to the respective predetermined values.

In the advertisement distributing system of the present invention, preferably, the predetermined values are the clustering coefficient and the average path length in a cluster whose node count is maximum, out of the other extracted clusters. This permits the clustering coefficient and the aver-

DESCRIPTION OF PREFERRED EMBODIMENTS

An embodiment of We advertisement distributing system and advertisement distributing method according to the present invention will be described below on the basis of the drawings. In each of the drawings, identical elements will be denoted by the same reference symbols, without redundant description.

Figure 1:
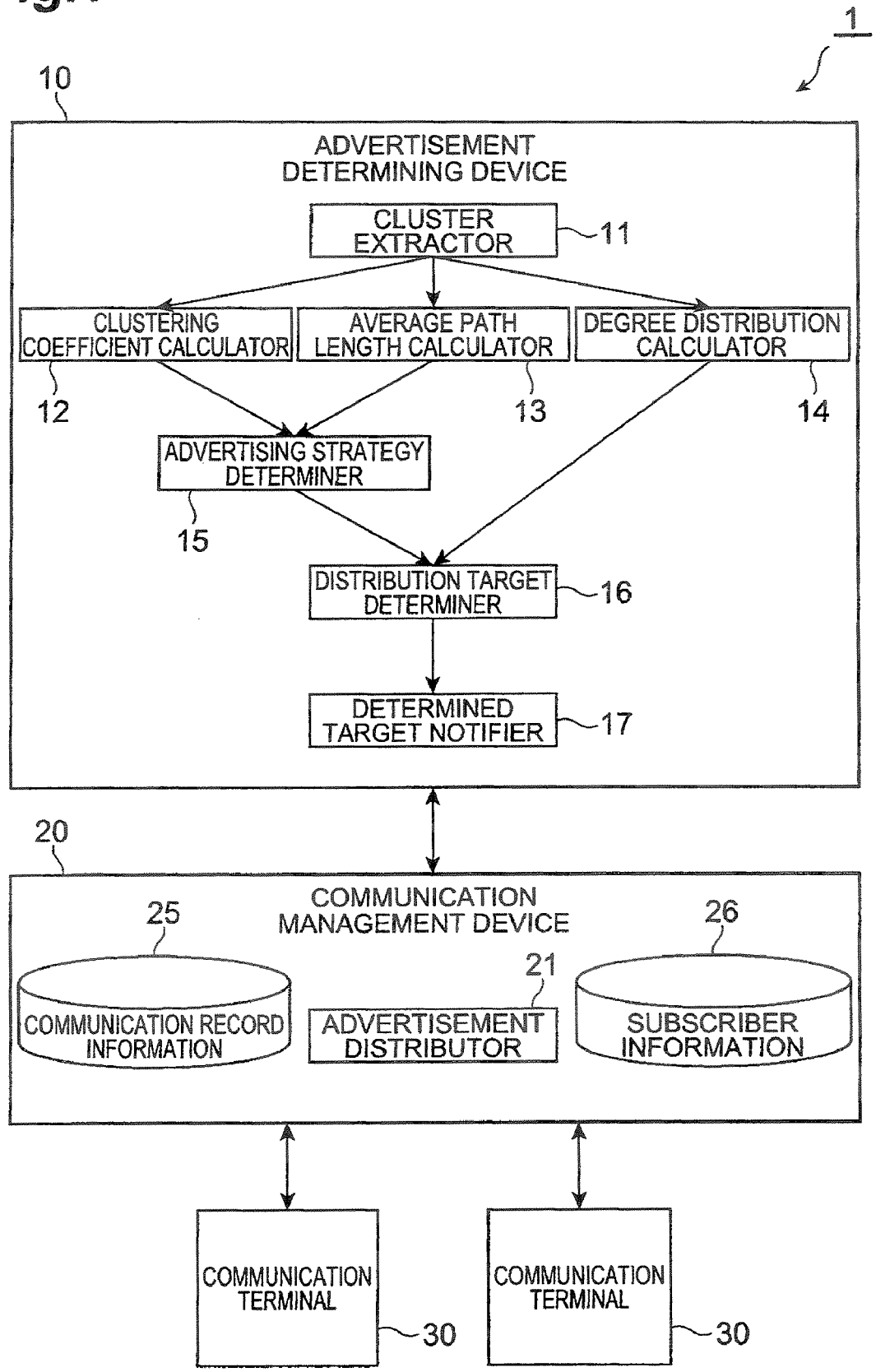
FIG. 1 is a drawing illustrating a system configuration of an advertisement distributing system in an embodiment of the invention, and functional configurations of an advertisement determining device and a communication management device.

FIG. 1 is a drawing illustrating a configuration of advertisement distributing system 1 in the present embodiment. As shown in FIG. 1, the advertisement distributing system 1 has an advertisement determining device 10 and a communication management device 20. The advertisement determining device 10 determines an advertising strategy for efficiently distributing an advertisement about promotion of subscription with a community service or about promotion of use of a community service to communication terminals 30 (nodes) participating in the community service, and determines communication terminals 30 as recipients of the advertisement according to an advertising strategy The communication management device 20 distributes the advertisement according to the advertising strategy to the communication terminals 30 matching the advertising strategy.

Next, a functional configuration of the advertisement determining device 10 will be described with reference to FIG. 1. As shown in FIG. 1, the advertisement determining device 10 has a cluster extractor 11, a clustering coefficient calculator 12, an average path length calculator 13, a degree distribution calculator 14, an advertising strategy determiner 15, a distribution target determiner 16, and a determined target notifier 17.

The cluster extractor 11 extracts clusters each of which is composed of communication terminals 30 registering to join a community service. The cluster extractor 11 extracts a plurality of clusters, based on communication records between communication terminals 30. A cluster in the present embodiment is created by a closed network of a communication terminal group having performed actual communication. The communication records between communication terminals 30 are stored in a communication record information database 25 managed by the communication management device 20.

A data configuration of the communication record information database 25 will be described below. The communication record information database 25 has, for example, the following data items: originator identification number, correspondent identification number, communication start time, communication duration, communication data amount, and communication charge. An originator identification number to be stored is an ID for uniquely specifying an originator communication terminal 30, and a correspondent identification number to be stored is an ID for uniquely specifying a correspondent communication terminal 30. A communication start time to be stored is a time at a start of a communication, and a communication duration to be stored is a time duration in which a communication is performed. A communication data amount to be stored is an amount of data exchanged in a communication, and a communication charge to be stored is a charge for a communication.

The clustering coefficient calculator 12 selects one cluster as a target for distribution of an advertisement (hereinafter referred to as an advertisement distribution target cluster) from the plurality of clusters extracted by the cluster extractor 11. The clustering coefficient calculator 12 calculates a clustering coefficient, based on communication records between communication terminals 30 belonging to the selected advertisement distribution target cluster. This clustering coefficient is an index indicating a use state of communication in the advertisement distribution target cluster. Namely, a larger clustering coefficient indicates more active communication in a cluster, and a smaller clustering coefficient indicates less active communication in a cluster.

The clustering coefficient in the advertisement distribution target cluster does not always have to be calculated based on the communication records between all the communication terminals 30 included in the advertisement distribution target cluster, and may be calculated, for example, based on communication records between some of communication terminals 30 belonging to the advertisement distribution target cluster. The clustering coefficient calculator 12 sequentially selects the advertisement distribution target cluster out of the plurality of clusters. This permits sequential distribution of advertisements to communication terminals 30 belonging to each of the clusters.

The average path length calculator 13 calculates an average path length of each communication terminal 30, based on the communication records between the communication terminals 30 belonging to the advertisement distribution target cluster, and obtains an average of all is thus calculated, to calculate an average path length in the advertisement distribution target cluster. This average path length is determined by bias of adjoining relations between communication terminals 30 in the cluster and a connection structure of links between communication terminals 30 in the cluster. Namely, the average path length is an index indicating a communication relationship among the communication terminals 30 belonging to the advertisement distribution target cluster. More specifically, a larger average path length indicates that links are less concentrated on a hub terminal (hub node) and that the function of the hub terminal is not fully exercised in the cluster, whereas a smaller average path length indicates that the hub terminal is more active and that the function of the hub terminal is fully exercised in the cluster.

The average path length in the advertisement distribution target cluster does not always have to be an average of all the average path lengths in the advertisement distribution target cluster, but may be, for example, a value calculated from an average of average path lengths between some of communication terminals 30 belonging to the advertisement distribution target cluster.

The degree distribution calculator 14 calculates a degree distribution, based on the communication records between the communication terminals 30 belonging to the advertisement distribution target cluster. This degree distribution is a distribution of degrees being link counts (correspondent counts) of the respective communication terminals 30 belonging to the advertisement distribution target cluster, and indicates a distribution state of numbers of communication terminals for the respective link counts.

The degree distribution in the present embodiment will be described below with reference to FIG. 2. In the degree distribution shown in FIG. 2, for example, the horizontal axis represents link counts of respective communication terminals 30, and the vertical axis numbers of communication terminals 30. For convenience of description hereinafter, a region A is defined as a region of a degree distribution in which communication terminals with small link counts, i.e., communication terminals formed in the periphery of the cluster are distributed; a region B is defined as a region of a degree distribution in which communication terminals with middle link counts, i.e., communication terminals formed near the center of the network in the cluster are distributed; a region C is defined as a region of a degree distribution in which communication terminals with large link counts, i.e., hub terminals are distributed.

The advertising strategy determiner 15 shown in FIG. 1 selects and determines at least one advertising strategy from a plurality of advertising strategies preliminarily stored in a memory, based on the clustering coefficient calculated by the clustering coefficient calculator 12 and the average path length in the advertisement distribution target cluster calculated by the average path length calculator 13. Specifically, the advertising strategy determiner 15 compares the clustering coefficient and average path length of the advertisement distribution target cluster extracted by the cluster extractor 11, with a clustering coefficient and average path length of a cluster with a maximum number of communication terminals (hereinafter referred to as a clustering coefficient and average path length of a typical cluster) out of the other clusters extracted by the cluster extractor 11, and determines a predetermined advertising strategy according to a result of the comparison, as an advertising strategy for the advertisement distribution target cluster.

The typical cluster does not have to be limited to the cluster with the maximum number of communication terminals, but may be a cluster of a predetermined size.

The target of the advertising strategy is determined by a factor to enable the clustering coefficient and average path length of the advertisement distribution target cluster to become closer to the clustering coefficient and average path length of the typical cluster. This permits the clustering coefficient and average path length of the advertisement distribution target cluster to become closer to the clustering coefficient and average path length of the typical cluster with distribution of an advertisement according to the advertising strategy. A specific example will be described below as a configuration wherein the target of the advertising strategy is set according to four cases of comparison results.

(1) A case where the clustering coefficient of the advertisement distribution target cluster is smaller than the clustering coefficient of the typical cluster and where the average path length of the advertisement distribution target cluster is larger than the average path length of the typical cluster. Namely, this case corresponds to a state in which the communication in the advertisement distribution target cluster is less active than the communication in the typical cluster and in which the hub terminal in the advertisement distribution target cluster is less active than the hub terminal in the typical cluster. In this case, the advertising strategy to be determined is one including a factor to increase the clustering coefficient and a factor to decrease the average path length. Specifically, the advertising strategy to be determined is, for example, one of distributing an advertisement (1-1) for promoting use of communication at communication terminals formed near the center of the network in the cluster, and an advertisement (1-2) for promoting use of communication at hub terminals.

(2) A case where the clustering coefficient of the advertisement distribution target cluster is smaller than the clustering coefficient of the typical cluster and where the average path length of the advertisement distribution target cluster is smaller than the average path length of the typical cluster. Namely, this case corresponds to a state in which the communication in the advertisement distribution target cluster is less active than the communication in the typical cluster and in which the hub terminal in the advertisement distribution target cluster is more active than the hub terminal in the typical cluster. In this case, the advertising strategy to be determined is one including a factor to increase the clustering coefficient. Specifically, the advertising strategy to be determined is, for example, one of distributing an advertisement (2-1) for promoting use of communication at communication terminals formed near the center of the network in the cluster.

(3) A case where the clustering coefficient of the advertisement distribution target cluster is larger than the clustering coefficient of the typical cluster and where the average path length of the advertisement distribution target cluster is larger than the average path length of the typical cluster. Namely, this case corresponds to a state in which the communication in the advertisement distribution target cluster is more active than the communication in the typical cluster and in which the hub terminal in the advertisement distribution target cluster is less active than the hub terminal in the typical cluster. In this case, the advertising strategy to be determined is one including a factor to decrease the average path length. Specifically, the advertising strategy to be determined is, for example, one of distributing an advertisement (3-1) for promoting use of communication at hub terminals.

(4) A case where the clustering coefficient of the advertisement distribution target cluster is larger than or approximately equal to the clustering coefficient of the typical cluster and where the average path length of the advertisement distribution target cluster is smaller than or approximately equal to the average path length of the typical cluster. Namely, this case corresponds to a state in which the communication in the advertisement distribution target cluster is more active than or approximately equal to the communication in the typical cluster and in which the hub terminal in the advertisement distribution target cluster is more active than or approximately equal to the hub terminal in the typical cluster. In this case, the advertising strategy to be determined is one including a factor to enlarge the cluster itself. Specifically, the advertising strategy to be determined is, for example, one of distributing an advertisement (4-1) for promoting subscription of new communication terminals, to communication terminals formed in the periphery of the advertisement distribution target cluster.

Communications induced by the advertisements distributed in accordance with the respective advertising strategies (1)-(4) described above will be described below with reference to FIG. 3. Reference symbol 30C in FIG. 3 represents a hub terminal, 30B communication terminals formed near a center of a network in a cluster, 30A communication terminals formed in the periphery of the cluster, and 30Z communication terminals not subscribed with the cluster.

Figure 3:
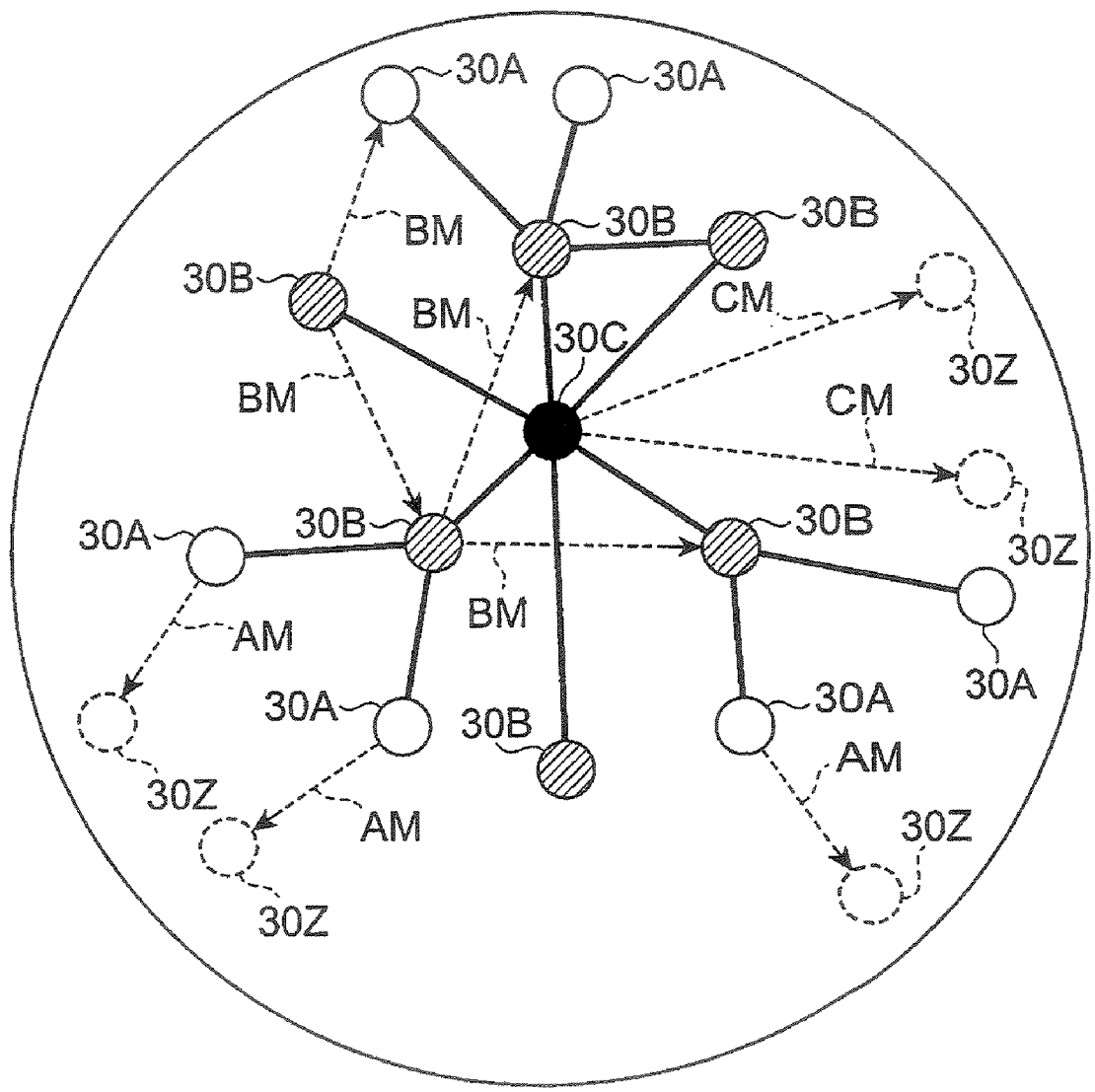
FIG. 3 is a schematic view for explaining communications induced by advertisements distributed according to advertising strategies.

The aforementioned advertisements (1-1), (2-1) for promoting use of communication at the communication terminals formed near the center of the network in the cluster are based on the strategy for bringing about communications BM shown in FIG. 3. Namely, they are advertisements for bringing about communications from communication terminals 30B formed near the hub terminal 30C, to other communication terminals in the cluster. By delivering such advertisements, it becomes feasible to increase the cluster coefficient.

The aforementioned advertisements (1-2), (3-1) for promoting use of communication at hub terminals are based on the strategy for bringing about communications CM shown in FIG. 3. Namely, they are advertisements for bringing about communications from the hub terminal 30C to communication terminals 30Z not subscribed with the cluster yet. By delivering such advertisements, it becomes feasible to decrease the average path length.

The aforementioned advertisement (4-1) for promoting subscription of new communication terminals, to the communication terminals formed in the periphery of the advertisement distribution target cluster is based on the strategy for bringing about communications AM shown in FIG. 3. Namely, it is an advertisement for bringing about communications from the communication terminals 30A formed in the periphery of the cluster, to communication terminals 30Z not subscribed with the cluster yet. By delivering such an advertisement, it becomes feasible to enlarge the cluster itself.

It is noted that the objects to be compared with the clustering coefficient and average path length of the advertisement distribution target cluster are not limited to the clustering coefficient and average path length of the typical cluster. For example, the clustering coefficient and average path length of the advertisement distribution target cluster may be compared with a given clustering coefficient and average path length preliminarily determined. This enables the clustering coefficient and average path length of the advertisement distribution target cluster to become closer to the clustering coefficient and average path length desired by a telecommunications carrier.

The distribution target determiner 16 shown in FIG. 1 selects and determines distribution target terminals (distribution target nodes) as targets for distribution of an advertisement out of the communication terminals 30 belonging to the advertisement distribution target cluster, based on the degree distribution calculated by the degree distribution calculator 14 and the advertising strategy determined by the advertising strategy determiner 15.

How to determine the distribution target terminals will be specifically described with reference to FIG. 2. When the advertising strategies determined by the advertising strategy determiner 15 are those described in (1) above, the distribution target determiner 16 determines that the distribution target terminals for distribution of the aforementioned advertisement (1-1) are communication terminals included in the region B in FIG. 2, i.e., the communication terminals 30B formed near the hub terminal 30C and that the distribution target terminals for distribution of the aforementioned advertisement (1-2) are communication terminals in the region C in FIG. 2, i.e., the hub terminal 30C.

Figure 2:
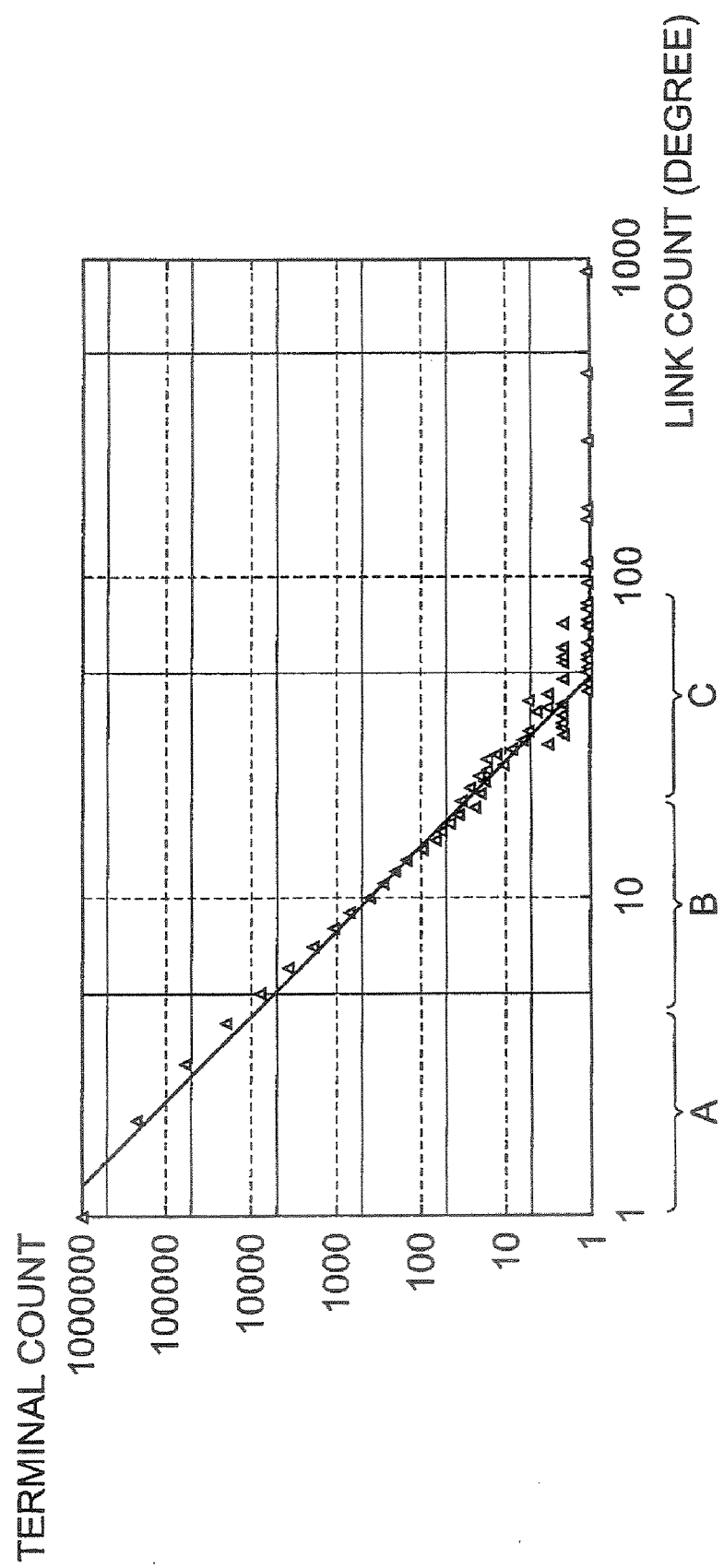
FIG. 2 is a drawing illustrating a degree distribution.

When the advertising strategy determined by the advertising strategy determiner 15 is the aforementioned advertising strategy described in (2) above, the distribution target determiner 16 determines that the distribution target terminals for distribution of the aforementioned advertisement (2-1) are communication terminals 30 in the region B in FIG. 2, i.e., the communication terminals 30B formed near the hub terminal 30C.

When the advertising strategy determined by the advertising strategy determiner 15 is the advertising strategy described in (3) above, the distribution target determiner 16 determines that the distribution target terminals for distribution of the aforementioned advertisement (3-1) are communication terminals in the region C in FIG. 2, i.e., the hub terminal 30C.

Furthermore, when the advertising strategy determined by the advertising strategy determiner 15 is the advertising strategy described in (4) above, the distribution target determiner 16 determines that the distribution target terminals for distribution of the aforementioned advertisement (4-1) are communication terminals in the region A in FIG. 2, i.e., the communication terminals 30A formed in the periphery of the cluster.

The determined target notifier 17 shown in FIG. 1 notifies the communication management device 20 of the determined target indicating that the advertisement according to the advertising strategy determined by the advertising strategy determiner 15 is to be distributed to the distribution target terminals determined by the distribution target determiner 16.

Next, a functional configuration of the communication management device 20 will be described with reference to FIG. 1. As shown in FIG. 1, the communication management device 20 has an advertisement distributor 21. The communication management device 20 is provided with the aforementioned communication record information database 25 and a subscriber information database 26.

The advertisement distributor 21 distributes the advertisement according to the advertising strategy determined by the advertisement determining device 10, to the distribution target communication terminals 30 determined by the advertisement determining device 10, based on the determined target notified of by the advertisement determining device 10.

A data configuration of the subscriber information database 26 will be described The subscriber information database 26 has, for example, the following data items: subscriber identification number, personal information, and agreement information. Subscriber identification number to be stored is an ID for uniquely specifying a communication terminal 30 owned by a subscriber. Personal information to be stored is information about a subscriber as an individual, e.g., contact information of the subscriber or the like, and agreement information to be stored is, for example, information about an agreement between the subscriber and a telecommunications carrier, such as a use plan of the subscriber.

Figure 4:
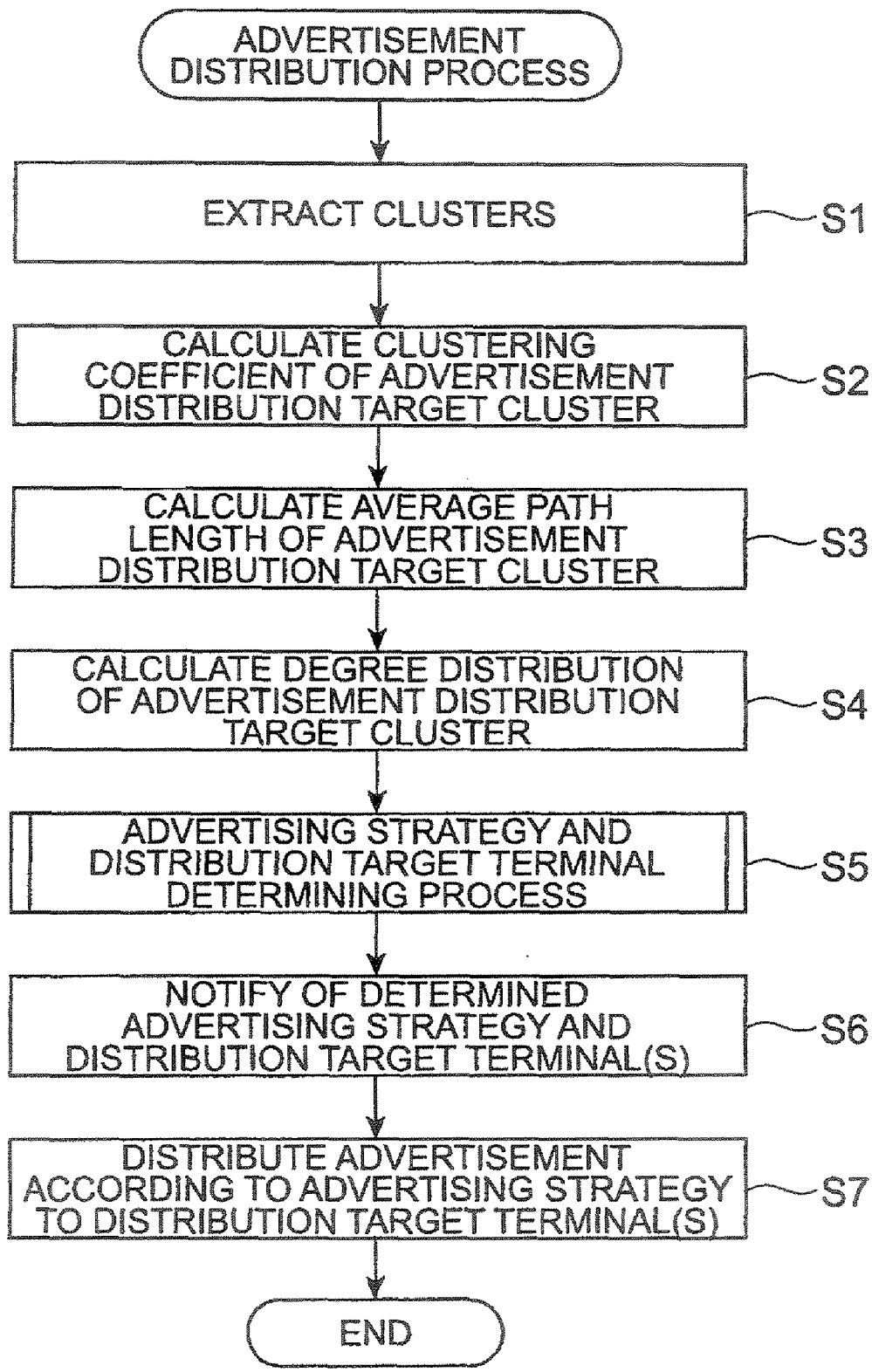
FIG. 4 is a flowchart for explaining a flow of an advertisement distributing process.

Next, a flow of an advertisement distribution process executed in the advertisement distributing system 1 in the present embodiment will be described with reference to FIG. 4.

First, the cluster extractor 11 of the advertisement determining device 10 extracts a plurality of clusters, based on communication records between communication terminals 30 registered to join community services (step S1).

Next, the clustering coefficient calculator 12 of the advertisement determining device 10 selects an advertisement distribution target cluster out of the plurality of clusters extracted by the cluster extractor 11 and calculates a clustering coefficient, based on communication records between communication terminals 30 belonging to this advertisement distribution target cluster (step S2).

Next, the average path length calculator 13 of the advertisement determining device 10 calculates average path lengths of respective communication terminals 30, based on the communication records between the communication terminals 30 belonging to the advertisement distribution target cluster, and obtains an average of all the calculated average path lengths to calculate an average path length of the advertisement distribution target cluster (step S3).

Next, the degree distribution calculator 14 of the advertisement determining device 10 calculates a degree distribution, based on the communication records between the communication terminals 30 belonging to the advertisement distribution target cluster (step S4).

Next, the advertising strategy determiner 15 of the advertisement determining device 10 determines an advertising strategy, based on the clustering coefficient calculated by the clustering coefficient calculator 12 and the average path length calculated by the average path length calculator 13, and the distribution target determiner 16 determines distribution target terminals, based on the degree distribution calculated by the degree distribution calculator 14 and the advertising strategy determined by the advertising strategy determiner (step S5). This process of determining the advertising strategy and distribution target terminals (advertising strategy and distribution target terminal determining process) will be described later in detail.

Next, the determined target notifier 17 of the advertisement determining device 10 notifies the communication management device of the distribution target terminals determined by the distribution target determiner 16 and the advertising strategy determined by the advertising strategy determiner 15 (step S6).

Next, the advertisement distributor 21 of the communication management device 20 distributes an advertisement according to the advertising strategy to the distribution target communication terminals 30, based on the target notified of by the advertisement determining device 10 (step S7).

Figure 5:
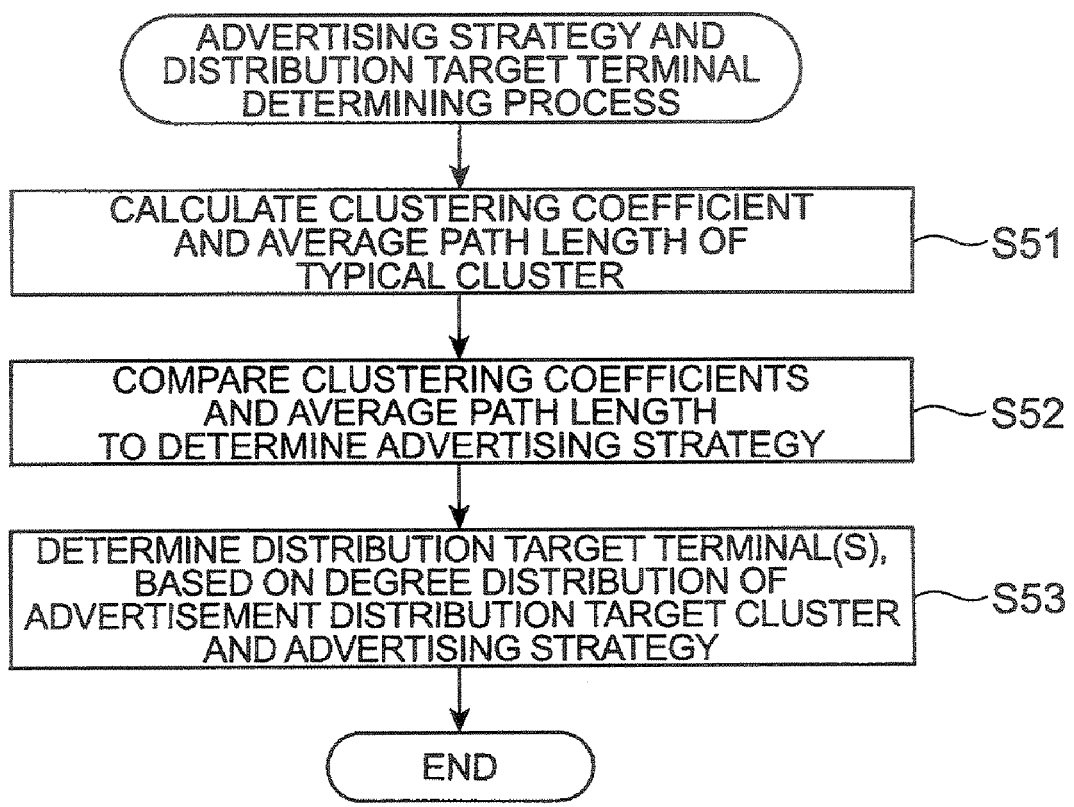
FIG. 5 is a flowchart for explaining a flow of an advertising strategy and distribution target determining process.

The flow of the aforementioned advertising strategy and distribution target terminal determining process will be described below with reference to FIG. 5.

First, the advertising strategy determiner 15 of the advertisement determining device 10 calculates the clustering coefficient and average path length of the typical cluster (step S51).

Next, the advertising strategy determiner 15 of the advertisement determining device 10 compares the clustering coefficient and average path length of the advertisement distribution target cluster with the clustering coefficient and average path length of the typical cluster and determines that a predetermined advertising strategy according to the result of the comparison is the advertising strategy for the advertisement distribution target cluster (step S52).

Next, the distribution target determiner 16 of the advertisement determining device 10 selects and determines the distribution target terminals as targets for distribution of the advertisement out of the communication terminals 30 belonging to the advertisement distribution target cluster, based on the degree distribution calculated by the degree distribution calculator 14 and the advertising strategy determined by the advertising strategy determiner 15 (step S53).

In the advertisement distributing system 1 of the present embodiment, as described above, the cluster extractor 11 forms a plurality of clusters in consideration of communication records between communication terminals 30, and the clustering coefficient calculator 12 calculates the clustering coefficient indicating a use state of communication in the advertisement distribution target cluster; therefore, it becomes feasible to grasp the use state of communication in the advertisement distribution target cluster.

The average path length calculator 13 calculates the average path lengths of the respective communication terminals 30 belonging to the advertisement distribution target cluster, and it thus becomes feasible to grasp the structure of communication relationship among the communication terminals 30 belonging to the advertisement distribution target cluster.

The degree distribution calculator 14 calculates the degree distribution indicating terminal counts for respective correspondent counts of each of the communication terminals 30 belonging to the advertisement distribution target cluster, and it thus becomes feasible to grasp the distribution of correspondent counts of the respective communication terminals 30 belonging to the advertisement distribution target cluster.

The advertising strategy determiner 15 determines the advertising strategy in consideration of the clustering coefficient and average path length, and it thus becomes feasible to determine the advertising strategy according to the use state of communication and the communication relationship among the communication terminals 30.

The distribution target determiner 16 determines the distribution target terminals 30 in consideration of the degree distribution and the advertising strategy, and it thus becomes feasible to determine the distribution target terminals 30 matching the advertising strategy, in consideration of the correspondent counts of the respective communication terminals 30.

The advertisement distributor 21 distributes the advertisement corresponding to the advertising strategy to the distribution target terminals 30. This enables the advertisement corresponding to the advertising strategy determined according to the use state of communication and the communication relationship among the communication terminals, to be distributed to the distribution target terminals 30 determined in consideration of the correspondent counts of the respective communication terminals 30, and it is thus feasible to appropriately distribute the advertisement about the communication service, i.e., the advertisement about promotion of subscription or promotion of use.

In the above-described embodiment, the functions of the advertisement distributing system 1 are arranged as dispersed to the advertisement determining device 10 and the communication management device 20, but the configuration for implementing each of the functions is not limited to this. Namely, all the functions may be arranged together in a single device, or the functions may be further distributed to three or more devices. In the case where all the functions are arranged together in a single device, there is no need for provision of the aforementioned determined target notifier 17, and the advertisement distributor 21 is arranged just to distribute the advertisement.

The advertising strategy and distribution target terminals are determined based on the clustering coefficient, average path length, and degree distribution at the present time, but the method of determining the advertising strategy and distribution target terminals is not limited to this. For example, they may be determined as follows: clustering coefficients, average path lengths, and degree distributions calculated in the past are accumulated and the advertising strategy and distribution target terminals are determined based on the accumulated information.

What is claimed is:
1. An advertisement distributing system comprising:
cluster extracting means for extracting a plurality of clusters, based on communication records between nodes at a plurality of nodes;
clustering coefficient calculating means for, based on communication records between nodes belonging to one cluster extracted by the cluster extracting means, calculating a clustering coefficient indicating a use state of communication in said one cluster;
average path length calculating means for calculating an average path length between nodes belonging to said one cluster, based on the communication records between the nodes belonging to the one cluster;

degree distribution calculating means for calculating a degree distribution indicating node counts for respective correspondent counts of the nodes belonging to said one cluster, based on the communication records between the nodes belonging to the one cluster;

advertising strategy determining means for selecting and determining at least one advertising strategy from a plurality of advertising strategies, based on the clustering coefficient calculated by the clustering coefficient calculating means, the average path length calculated by the average path length calculating means and respective predetermined values, the respective predetermined values being a clustering coefficient and an average path length in a cluster whose node count is maximum out of other clusters extracted by the cluster extracting means;

distribution target determining means for selecting and determining a distribution target node as a target for distribution of an advertisement from the nodes belonging to the one cluster, based on the degree distribution calculated by the degree distribution calculating means and the at least one advertising strategy determined by the advertising strategy determining means; and distributing means for distributing the advertisement corresponding to the at least one advertising strategy determined by the advertising strategy determining means, to the distribution target node determined by the distribution target determining means.

2. An advertisement distributing system according to claim 1, wherein the advertising strategy determining means selects the at least one advertising strategy including a factor to enable the clustering coefficient calculated by the clustering coefficient calculating means and the average path length calculated by the average path length calculating means to become closer to the respective predetermined values.

3. An advertisement distributing method comprising the following steps executed by a computer:

a cluster extracting step of extracting a plurality of clusters, based on communication records between nodes at a plurality of nodes;

a clustering coefficient calculating step of based on communication records between nodes belonging to one cluster extracted in the cluster extracting step, calculating a clustering coefficient indicating a use state of communication in said one cluster;

an average path length calculating step of calculating an average path length between nodes belonging to said one cluster, based on the communication records between the nodes belonging to the one cluster;

a degree distribution calculating step of calculating a degree distribution indicating node counts for respective correspondent counts of the nodes belonging to said one cluster, based on the communication records between the nodes belonging to the one cluster;

an advertising strategy determining step of selecting and determining at least one advertising strategy from a plurality of advertising strategies, based on the clustering coefficient calculated in the clustering coefficient calculating step, the average path length calculated in the average path length calculating step and respective predetermined values, the respective predetermined values being a clustering coefficient and an average path length in a cluster whose node count is maximum out of other clusters extracted by the cluster extracting step;

a distribution target determining step of selecting and determining a distribution target node as a target for distribution of an advertisement from the nodes belonging to the one cluster, based on the degree distribution calculated in the degree distribution calculating step and the at least one advertising strategy determined in the advertising strategy determining step; and a distributing step of distributing the advertisement corresponding to the at least one advertising strategy determined in the advertising strategy determining step, to the distribution target node determined in the distribution target determining step.

4. An advertisement distributing system comprising:

a cluster extractor configured to extract a plurality of clusters, based on communication records between nodes at a plurality of nodes;

a clustering coefficient calculator configured to calculate, based on communication records between nodes belonging to one cluster extracted by the cluster extractor, a clustering coefficient indicating a use state of communication in said one cluster;

an average path length calculator configured to calculate an average path length between nodes belonging to said one cluster, based on the communication records between the nodes belonging to the one cluster;

a degree distribution calculator configured to calculate a degree distribution indicating node counts for respective correspondent counts of the nodes belonging to said one cluster, based on the communication records between the nodes belonging to the one cluster;

an advertising strategy determiner configured to select and determine at least one advertising strategy from a plurality of advertising strategies, based on the clustering coefficient calculated by the clustering coefficient calculator, the average path length calculated by the average path length calculator and respective predetermined values, the respective predetermined values being a clustering coefficient and an average path length in a cluster whose node count is maximum out of other clusters extracted by the cluster extractor;

a distribution target determiner configured to select and determine a distribution target node as a target for distribution of an advertisement from the nodes belonging to the one cluster, based on the degree distribution calculated by the degree distribution calculator and the at least one advertising strategy determined by the advertising strategy determiner; and a distributor configured to distribute the advertisement corresponding to the at least one advertising strategy determined by the advertising strategy determiner, to the distribution target node determined by the distribution target determiner.

* * * * *